(No Model.) 3 Sheets—Sheet 1.

G. G. THOMAS.
PARLOR HEATING STOVE.

No. 256,411. Patented Apr. 11, 1882.

Witnesses
David S. Williams
Harry Drury

Inventor:
George G. Thomas
by his Attorneys:
Howson and Son (No Model.) 3 Sheets—Sheet 2.
G. G. THOMAS.
PARLOR HEATING STOVE.
No. 256,411. Patented Apr. 11, 1882.
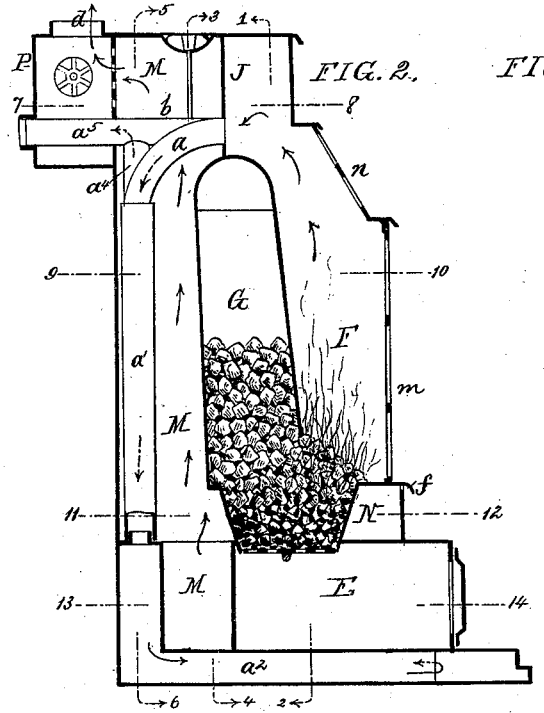
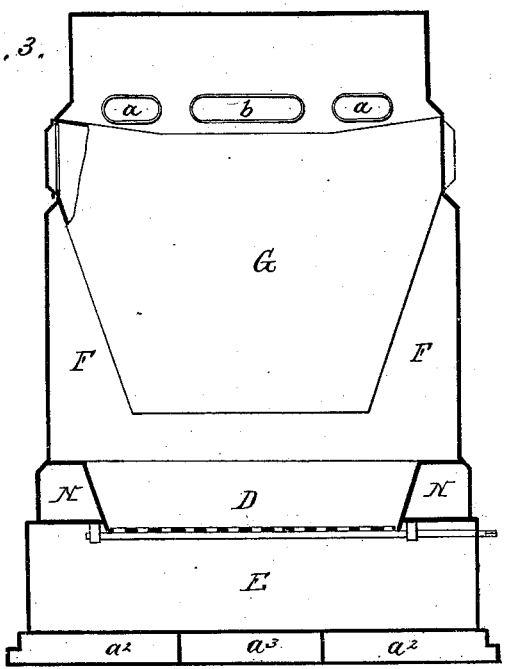
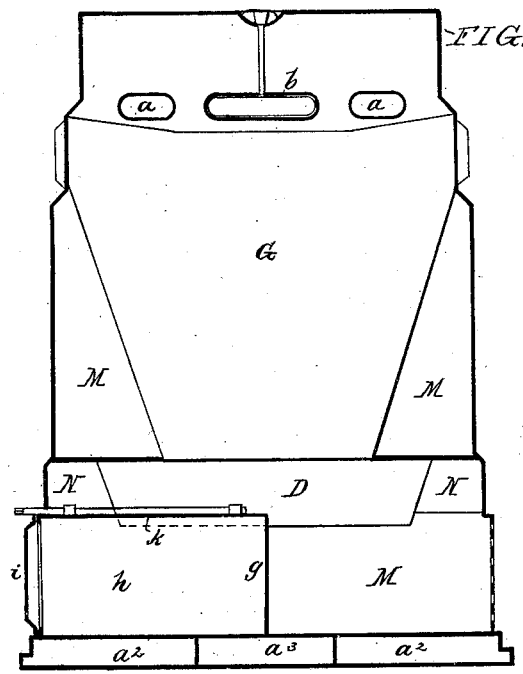
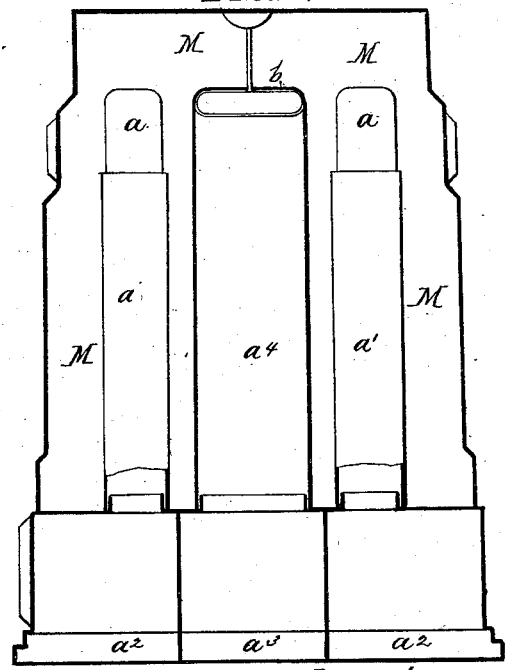
Witnesses:
James T. Tobin.
Harry Drury.
Inventor:
George G. Thomas
by his Attorneys
Howson and Sons (No Model.) 3 Sheets—Sheet 3.

G. G. THOMAS.
PARLOR HEATING STOVE.

No. 256,411. Patented Apr. 11, 1882.

Witnesses:
James T. Tobin
Harry Drury

Inventor:
George G. Thomas
by his Attorneys
Howson and Son

UNITED STATES PATENT OFFICE.

GEORGE G. THOMAS, OF PHILADELPHIA, PENNSYLVANIA.

PARLOR HEATING-STOVE.

SPECIFICATION forming part of Letters Patent No. 256,411, dated April 11, 1882.

Application filed February 13, 1882. (No model.)

*To all whom it may concern:*

Be it known that I, GEORGE G. THOMAS, a citizen of the United States, and a resident of Philadelphia, Pennsylvania, have invented certain Improvements in Parlor Heating-Stoves, of which the following is a specification.

The object of my invention is to construct a parlor-heater having an attractive external appearance, extended illuminating and heat-radiating surfaces, large magazine capacity, and provision for heating large volumes of air independently of the heat radiated from the outer surface of the stove.

Figure 1:
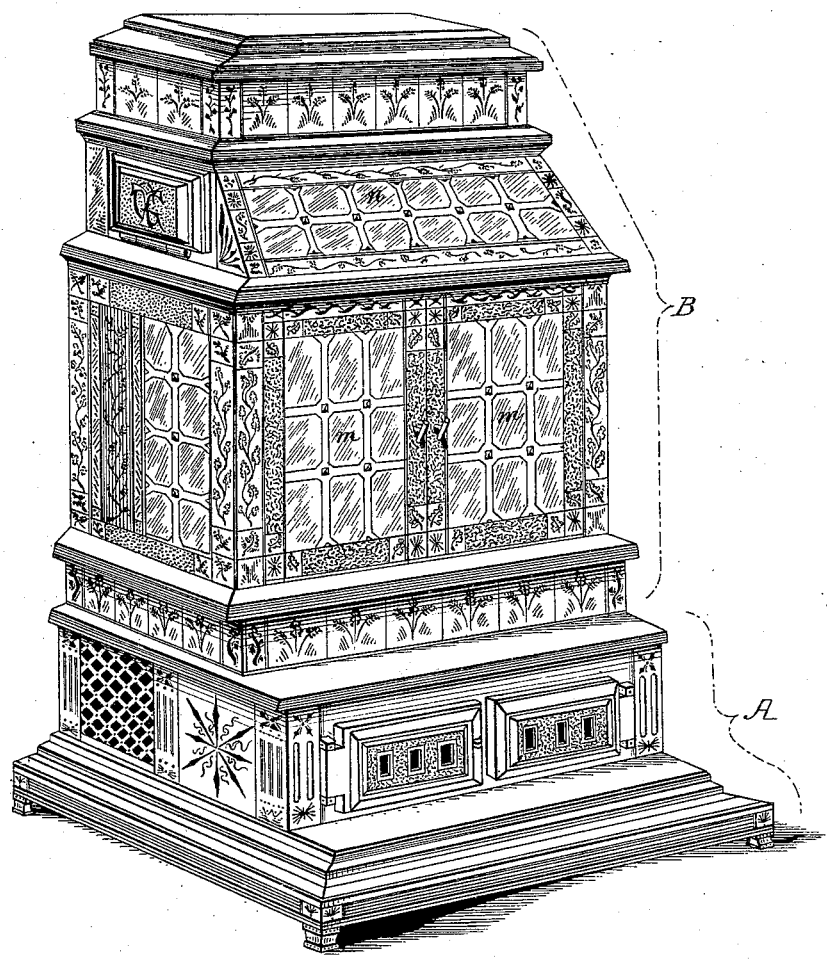
Figure 6:
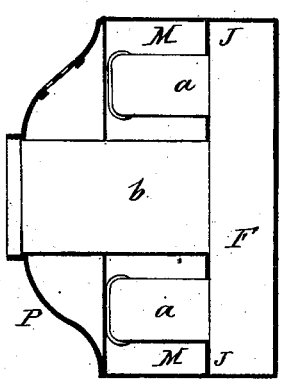
Figure 7:
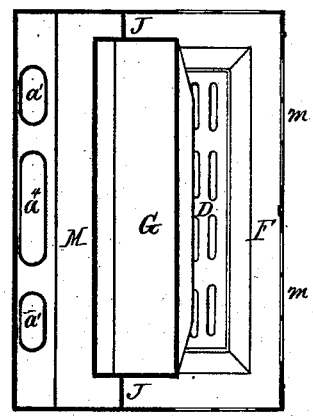
Figure 8:
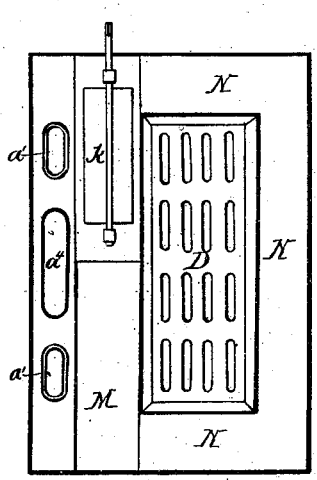
Figure 9:
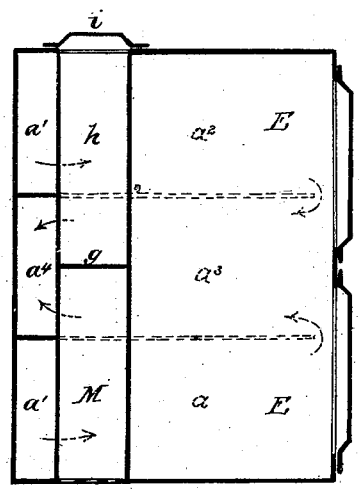

In the accompanying drawings, Figure 1, Sheet 1, is a perspective view of the stove; Fig. 2, Sheet 2, a vertical sectional view of the same; Fig. 3, a section on the line 1 2, Fig. 2; Fig. 4, a section on the line 3 4, Fig. 2; Fig. 5, a section on the line 5 6, Fig. 2; and Figs. 6, 7, 8, and 9, Sheet 3, sectional plans on the lines 7 8, 9 10, 11 12, and 13 14, respectively.

The general shape or outline of the stove is rectangular, as shown in Fig. 1, the stove comprising two main parts, the base or ash-pit section A and the upper or illuminating section, B.

D is the fire-pot, E the ash-pit, F the combustion-chamber, and G the magazine, the latter at its upper end extending transversely from side to side of the stove-casing, but being contracted at the lower end where it discharges into the fire-pot. The upper end of the magazine may be furnished with a feed-door at each side of the stove or at one side only, as may be preferred. The products of combustion pass from the combustion-chamber F through flues $a\,a$ above the magazine, and thence through descending flues $a'$ at the rear of the stove, through the usual flues, $a^2\,a^3$, in the hollow base, and through the ascending flue $a^4$ at the rear to the escape-pipe $a^5$, by which they are conveyed to the chimney. The upper end of the ascending flue $a^4$ communicates through a dampered flue, $b$, with the upper end of the combustion-chamber, in order to provide a direct draft when necessary.

From the top to the bottom of the stove, and from side to side of the same, or from the side casings to the magazine G, extends a partition, J, which serves with said magazine to separate the combustion-chamber F from a chamber, M, at the rear of the same, this chamber receiving air through a grated opening in the side of the base-section of the stove. The air thus admitted to the chamber M rises therein, and is brought into intimate contact with the rear of the fire-pot, magazine, and partition J, and with the casings of the flues $a$, $a'$, $a^2$, $a^3$, and $a^4$, and is thereby highly heated, the hot air escaping through the grated opening at the top of the rear casing of the stove into a chamber within a casing, P, bolted to said rear casing, and from this chamber the hot air ascends through a pipe, $d$, into another room or apartment; or, when it is not desired to so direct the hot air, a damper in the pipe $d$ may be closed and a register in the casing P opened, so as to permit the escape of the air into the room in which the stove is situated.

In some stoves the casing P may be omitted, and the hot air permitted to pass directly into the room through the grated opening in the rear casing of the stove.

The heating-chamber M in some cases need not extend below the fire-pot, in which case the partition in the ash-pit can be dispensed with; but the construction shown is preferred, as it provides for a more thorough utilization of the heat of the flues $a'\,a^4$ and of the flues in the base of the stove. As the cold air enters the chamber M it is brought into contact with the rear wall of the magazine, and serves to keep said wall comparatively cool and prevent the rapid burning away of the same, due to the banking of a mass of hot coals against it. The magazine G projects rearwardly beyond the partition J and into the chamber M, so as to increase the surface exposed to cold air and not unduly contract the size of the combustion-chamber.

Surrounding the fire-pot is a chamber, N, to which cold air gains access through an opening, $f$, in the front of the stove, the air heated by contact with the walls of the fire-pot passing into the chamber M.

In the lower portion of the chamber M is a partition, $g$, which incloses a chamber, $h$, having a door, $i$, this chamber $h$ serving as an oven or warming-closet. The horizontal portion of the partition $g$ has a damper, $k$, however, so that when it is not desired to use the oven for cooking purposes said oven can be permitted to communicate with the chamber M, and air heated in the oven can pass therefrom into said chamber.

The front m of the stove-casing is provided with illuminating-windows and has a receding top, n, also furnished with windows, this receding top occupying a position above the mass of fuel in the fire-pot, so as to permit the upward passage of rays of light therefrom.

The placing of the exit-flues a above the magazine compels the products of combustion to ascend to the top of the stove before they can enter these flues. Hence the entire casing of the top and front of the stove above the fire-pot is subjected to the action of said products of combustion, is highly heated thereby, and forms an effective radiating-surface. The opposite sides of the stove also have illuminating-windows in those portions which are in line with the combustion-chamber F, so that in addition to the large heat-radiating surface presented there is an extended illuminating-surface, which imparts to the stove a cheerful and attractive appearance.

Owing to the shape of the stove, the magazine has a large capacity, and needs to be replenished only at long intervals; and as the upper end of the magazine is attached to both sides of the stove, said magazine is properly supported, and its weight has no tendency to impair the joints between the different sections of the stove.

I claim as my invention—

1. The combination of the combustion-chamber F and the heating-chamber M in the rear of the same with a magazine and a partition, J, separating the said chambers, both magazine and partition being exposed at the front to the products of combustion and at the rear to the air to be heated, as set forth.

2. The combination of the combustion-chamber F, the hot-air chamber M, the partition J, and magazine G, separating the two chambers, and the ascending and descending flues $a'$ $a^4$ in the rear of said chamber M, as set forth.

3. The combination of the combustion-chamber F, the hot-air chamber M, the partition J, and magazine G, separating the two chambers, the ascending and descending flues $a'$ $a^4$ in the chamber M, and the connecting-flues $a^2$ $a^3$ in the hollow base of the stove, as set forth.

4. The combination of the combustion-chamber F and the heating-chamber M in the rear of the same with the magazine G and partition J, separating the said chambers, said magazine projecting partly into the combustion-chamber and partly into the heating-chamber, as set forth.

5. The combination of the stove having the heating-chamber M and rear and base flues, as described, with the partition g and door i, forming an oven, h, in the said chamber M, as set forth.

6. The combination of the stove having the heating-chamber M and rear and base flues, as described, with the door i and the partition g, having a damper, k, as set forth.

In testimony whereof I have signed my name to this specification in the presence of two subscribing witnesses.

GEO. G. THOMAS.

Witnesses:
HARRY DRURY,
HARRY SMITH.